United States Patent
Kipp et al.

(10) Patent No.: US 8,296,916 B2
(45) Date of Patent: Oct. 30, 2012

(54) REPAIR METHOD FOR ELECTRIC AIRCRAFT BRAKE

(75) Inventors: Richard Arthur Kipp, Troy, OH (US); Steven Campbell, Troy, OH (US); Timothy Mark Himes, Troy, OH (US)

(73) Assignee: Goodrich Corporation, Charlotte, NC (US)

( * ) Notice: Subject to any disclaimer, the term of this patent is extended or adjusted under 35 U.S.C. 154(b) by 451 days.

(21) Appl. No.: 12/595,688

(22) PCT Filed: May 21, 2008

(86) PCT No.: PCT/US2008/064334
§ 371 (c)(1),
(2), (4) Date: Oct. 13, 2009

(87) PCT Pub. No.: WO2008/144718
PCT Pub. Date: Nov. 27, 2008

(65) Prior Publication Data
US 2010/0101068 A1    Apr. 29, 2010

Related U.S. Application Data

(60) Provisional application No. 60/939,227, filed on May 21, 2007.

(51) Int. Cl.
*B23P 6/00* (2006.01)
*F16D 65/14* (2006.01)
(52) U.S. Cl. .................. 29/402.03; 29/402.08; 29/426.1
(58) Field of Classification Search .............. 29/402.04, 29/402.08; 188/72.1, 72.3
See application file for complete search history.

(56) References Cited

U.S. PATENT DOCUMENTS

| | | | |
|---|---|---|---|
| 6,095,293 A | 8/2000 | Brundrett et al. | |
| 6,480,130 B1 * | 11/2002 | Hanson et al. | 341/144 |
| 6,530,625 B2 * | 3/2003 | Arnold et al. | 303/126 |
| 6,662,907 B1 * | 12/2003 | Brundrett et al. | 188/71.6 |
| 7,618,100 B2 * | 11/2009 | Griffith et al. | 303/20 |
| 2005/0115778 A1 * | 6/2005 | Chico et al. | 188/72.1 |

FOREIGN PATENT DOCUMENTS

| | | |
|---|---|---|
| WO | 01/15948 | 3/2001 |
| WO | 2006/025905 | 3/2006 |

OTHER PUBLICATIONS

International Preliminary Report on Patentability, PCT/US2008/064334, dated Nov. 21, 2009.
Written Opinion, PCT/US2008/064334, dated Nov. 21, 2009.
Initial Publication with International Search Report, PCT/US2008/064334, dated Sep. 29, 2008.
EP; Examination Report dated Apr. 13, 2010 in Application No. 08756031.4.

* cited by examiner

*Primary Examiner* — Alexander P Taousakis
(74) *Attorney, Agent, or Firm* — Snell & Wilmer L.L.P.

(57) ABSTRACT

A method for enabling removal and replacement of a failed actuator module of a brake assembly that includes multiple actuators (27) for compressing a brake disk stack (12), wherein the failed actuator has failed in an extended position applying compressive force to the brake disk stack and at least one of the other actuators remains operative. The method comprises the steps of causing one or more of the operative actuators to apply to the brake disk stack a compressive force greater than the compressive force exerted by the failed actuator whereby the reactionary force acting on the failed actuator will be reduced, and removing the failed actuator after the reactionary load on the failed actuator has been reduced.

6 Claims, 4 Drawing Sheets

REPAIR METHOD FOR ELECTRIC AIRCRAFT BRAKE

CROSS-REFERENCE TO RELATED APPLICATIONS

This application is a U.S. National Phase filing under 35 U.S.C. 371 and claims priority to PCT Application No. PCT/US08/64334, filed on May 21, 2008, and entitled "REPAIR OF ELECTRIC AIRCRAFT BRAKE," which claims priority to U.S. Provisional Patent Application Ser. No. 60/939,227, filed May 21, 2007, both of which are incorporated herein by reference in their entirety.

FIELD OF THE INVENTION

The invention herein described relates generally to an electric brake particularly useful in aircraft, and more particularly to an electric brake that includes multiple actuators, particularly electromechanical actuators, for compressing a disk stack (also commonly referred to as a heat sink).

BACKGROUND OF THE INVENTION

Known in the prior art are aircraft wheel and brake assemblies including a non-rotatable wheel support, a wheel mounted to the wheel support for rotation, and a brake disk stack having front and rear axial ends and alternating rotor and stator disks mounted with respect to the wheel support and wheel for relative axial movement. Each rotor disk is coupled to the wheel for rotation therewith and each stator disk is coupled to the wheel support against rotation. A back plate is located at the rear end of the disk stack and a brake head is located at the front end. The brake head houses a plurality of actuator rams that extend to compress the brake disk stack against the back plate. Torque is taken out by the stator disks through a static torque tube or the like.

U.S. Pat. No. 6,095,293 discloses an electric brake and method characterized by the use of actuator modules each of which can be easily and quickly replaced as a unit. This enables quick and easy replacement of the actuator modules without requiring disassembly of the overall brake and wheel assembly. Also, it is conceivable that a malfunctioning actuator module could be replaced on an aircraft and tested with a minimum of equipment preferably quickly enough to allow the aircraft to remain in scheduled service and/or with a minimum of downtime.

A problem arises if an actuator fails in an extended position applying a high compressive force to the brake disk stack. Under such conditions, a high reactionary load will be applied to the failed actuator, making it awkward and difficult to remove the failed actuator.

SUMMARY OF THE INVENTION

The present invention provide a method for enabling removal and replacement of a failed actuator module of a brake assembly that includes multiple actuators for compressing a brake disk stack, wherein the failed actuator has failed in an extended position applying compressive force to the brake disk stack and at least one of the other actuators remains operative. The method comprises the steps of causing one or more of the operative actuators to apply to the brake disk stack a compressive force greater than the compressive force exerted by the failed actuator whereby the reactionary force acting on the failed actuator will be reduced, and removing the failed actuator after the reactionary load on the failed actuator has been reduced.

The causing step may include commanding the one or more of the operative actuators to extend and apply compressive force to the brake disk stack.

In those instances where each actuator is normally connected to a controller by mating connectors, the mating connector for the failed actuator may be disconnected prior to the one or more of the operative actuators being commanded to extend.

After removal of the failed actuator, a replacement actuator may be installed in place of the failed actuator.

The removing step may includes demounting the failed actuator from an actuator mount to which a plurality of the actuators are mounted.

The actuators may have a flange for engaging a side of the actuator mount facing the brake disk stack, whereby axial reactionary loads are transferred from the actuator flange to the actuator mount, and wherein in the failed condition the failed actuator is jammed between the brake disk stack and the actuator mount.

The foregoing and other features of the invention are described below in reference to the drawings.

DETAILED DESCRIPTION OF THE INVENTION

Because the invention was conceived and developed for use in an aircraft braking system, it will be herein described chiefly in this context. However, the principles of the invention in their broader aspects can be adapted to other types of braking systems, such as in train brake systems.

Figure 1:
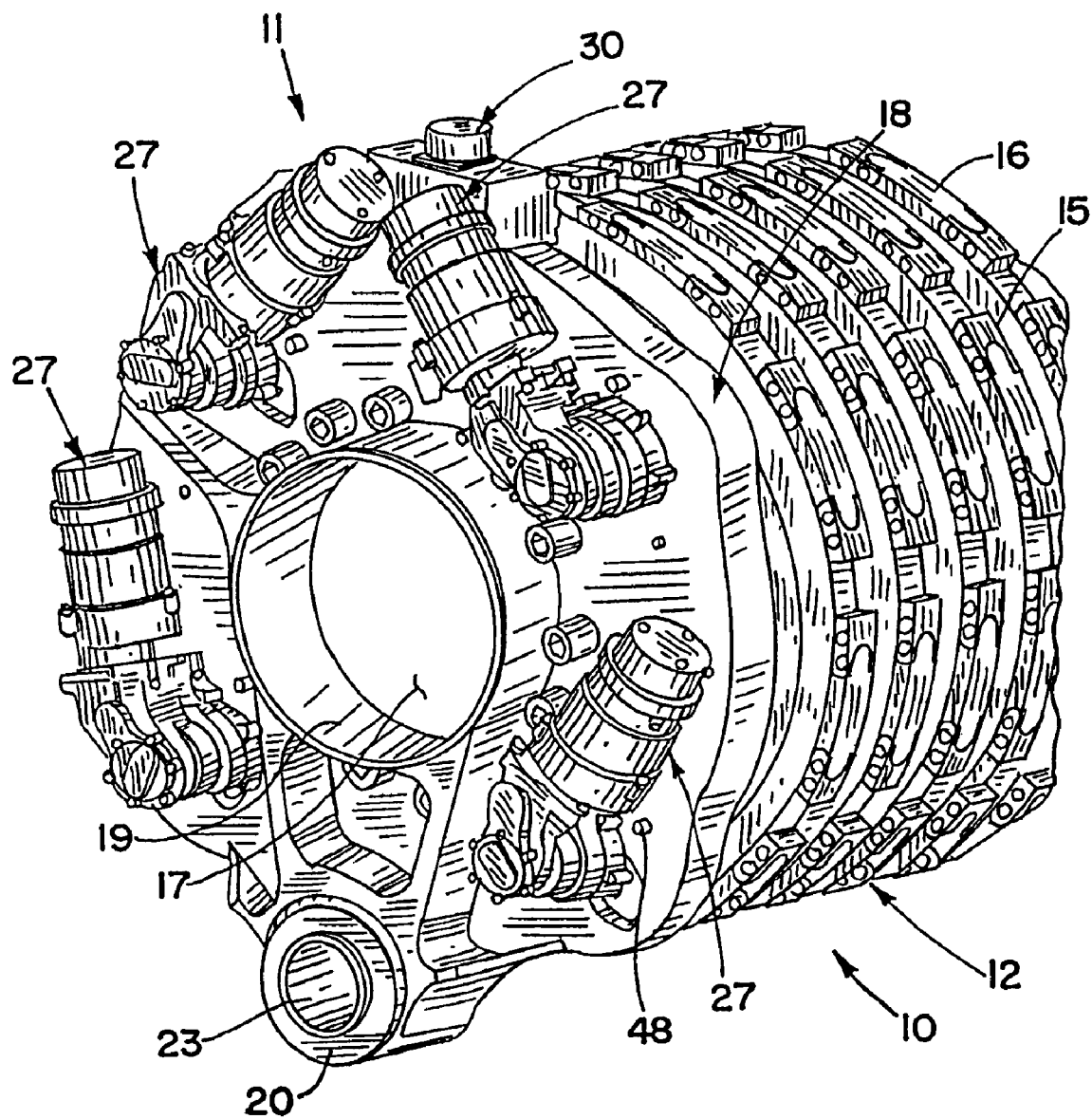
FIG. 1 is perspective rendering of an electric brake according to the invention.

Referring now in detail to the drawings and initially to FIG. 1, an electric brake according to the present invention is generally indicated at 10. The brake 10 generally comprises a brake actuator assembly 11 and a heat sink in the form of a brake disk stack 12. The brake disk stack 12 can be of a conventional or other design including stationary brake elements and rotary brake elements that are interleaved and surround a torque tube or equivalent (not shown). The stationary and rotary brake elements usually are in the form of stator disks 15 and rotor disks 16. The stator disks 15 typically are splined to a torque tube 17 and the rotor disks 16 are splined to a wheel (not shown) interiorly of the wheel's rim. As is conventional, the splined connection may be effected by a plurality of spline or drive keys that are spaced around the circumference of the rim/torque tube to permit axial movement of the rotor/stator disks while being held to the wheel/torque tube against relative rotation.

The wheel (not shown) typically is supported for rotation on an axle (not shown) by axially spaced apart bearings (not shown). The axle thus forms a wheel mount and typically is attached to an aircraft landing gear strut or truck (not shown). For further details, reference may be had to U.S. Pat. No. 6,662,907, which is hereby incorporated herein by reference in its entirety.

The brake actuator assembly 11 includes a brake head 18 that can also be referred to as a brake housing or, in the present case, more particularly as a brake mounting plate. The brake mounting plate has a central opening 19 for mounting of the brake mounting plate on the landing gear axle or other wheel support. For some applications the brake mounting plate can be formed integrally with or fixedly secured (as by splines, bolts, etc.) to the axle or other wheel support for direct transfer of braking torque to the axle or other wheel support. In the illustrated embodiment, the brake mounting plate is supported on the axle for limited rotational movement, and the brake mounting plate is provided with an torque take-out arm 20. The torque take-out arm 20 extends radially and functions as a torque transfer interface between the brake actuator assembly and the landing gear axle/strut/truck structure. More particularly, the torque take-out arm 20 has an eye 23 the provides for connection to a brake rod that in turn is connected to the landing gear axle/strut/truck structure, as in a conventional manner, to provide for transfer of torque from the torque take-out arm to the landing gear axle/strut/truck structure when braking force is being applied to the disk brake stack 12 by the brake actuator assembly 11.

The disk stack 12 typically is located between a back pressure member (not shown) and the brake mounting plate 18. The back pressure member can be formed by a radial flange at the end of the torque tube opposite the brake mounting plate, which radial flange engages the last brake disk at the outboard end of the disk stack typically through the use of a plurality of circumferentially spaced apart pucks. For further details, reference may be had to U.S. Pat. No. 6,662,907.

Pressure is applied to the other or inboard end of the disk stack 12 by the ram 26 (FIG. 3) of one or more actuator modules 27 that are mounted to the brake mounting plate 18. The actuator modules 27 preferably are mounted in a circular arrangement around the center axis of the brake mounting plate 18, preferably with the actuator rams 26 generally circumferentially equally spaced apart and/or with the rams arranged in diametrically opposed pairs. The actuator modules 27 can be connected by any suitable means such as cables to a single interface connector 30 to which a mating connector of a control cable (not shown) can be detachably connected for connecting the brake 10 to a brake controller (not shown) located elsewhere. The brake mounting plate serves as the platform for mounting the actuator modules and for reacting actuation and torque loads from the brake to an aircraft brake rod or other landing gear structure.

Figure 3:
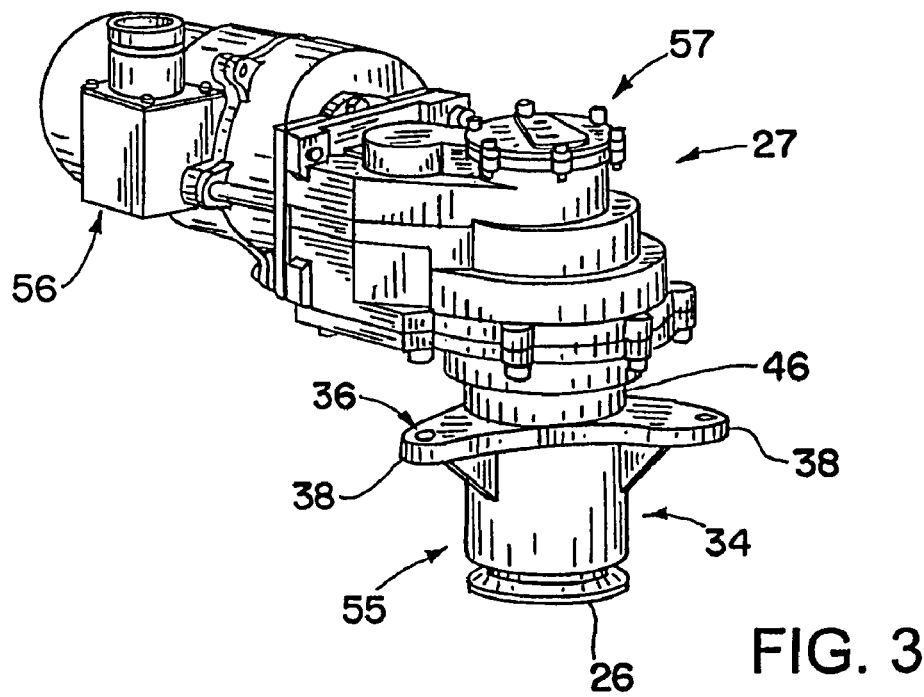
FIG. 3 is a perspective view of an actuator module used in the electric brake of FIG. 1.

Preferably, the actuator modules 27 are identical and interchangeable, and a representative one of the actuator modules is shown in FIG. 3. Each actuator module has a housing 34 that has a radial mounting flange 36 for mounting to the brake mounting plate 18. The mounting flange 36 has a non-circular peripheral shape for providing a bayonet-like connection to the brake mounting plate. In the illustrated embodiment the mounting flange as one or more, and preferably three, radially extending arms or lobes 38. The three lobes have essentially the same shape and are circumferentially equally spaced apart, thereby giving the mounting flange an overall triangular shape.

The mounting flange 36 is shaped to allow insertion into a respective aperture 42 in the brake mounting plate 18. In the embodiment shown in FIG. 2, each aperture 42 has a shape corresponding to the shape of the respective mounting flange, i.e., a multi-lobe triangular shape. It will be appreciated, however, that the illustrated shape is exemplary and the flange and aperture can be otherwise shaped.

Figure 2:
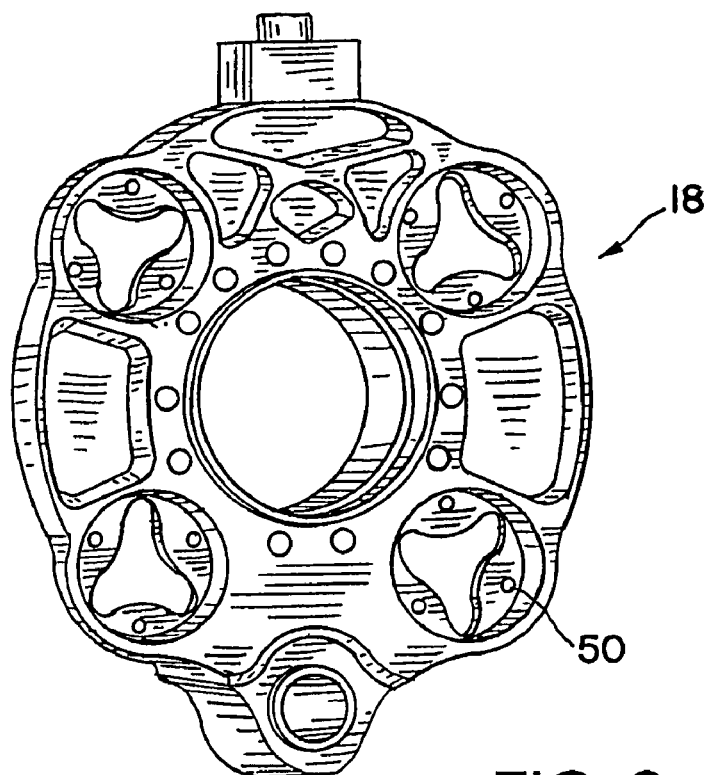
FIG. 2 is a perspective rendering of a brake mounting plate used in the electric brake of FIG. 1.

The mounting flange 36 is also located adjacent a rotation neck portion 46 of the actuator module housing 34. The rotation neck portion has a length at least equal the thickness of the brake mounting plate 18 in the region thereof bounding the respective aperture 42. This allows the mounting flange to be inserted through the aperture and positioned on the outboard side of the brake mounting plate. The rotation neck portion will then be disposed within the aperture whereupon the actuator module can be rotated relative to the brake mounting plate. Such rotation will cause the mounting flange to be rotated to a position where it can engage the outboard side of the brake mounting plate and be secured against rotation by one or more fastening devices. In the illustrated embodiment, the fastening devices are bolts 48 that are threaded into holes 50 in the brake mounting plate 18, there being three bolts and holes for each actuator. As shown in FIG. 2, the brake mounting plate can be provided with recesses on its outboard side for accommodating the mounting flanges of the actuator housings such that the flanges do not project beyond the outboardmost surface of the brake mounting plate. As used herein, the outboard side of the brake mounting plate is the side nearest the brake disk stack.

As will be appreciated, braking load acting axially on each actuator module will be passed from the actuator module to the brake mounting plate without passing through the removable bolts 48 or other fastening device used to attach the actuator module to the brake mounting plate. Accordingly, one or more smaller and lighter fasteners can be used to effect attachment.

Figure 4A:
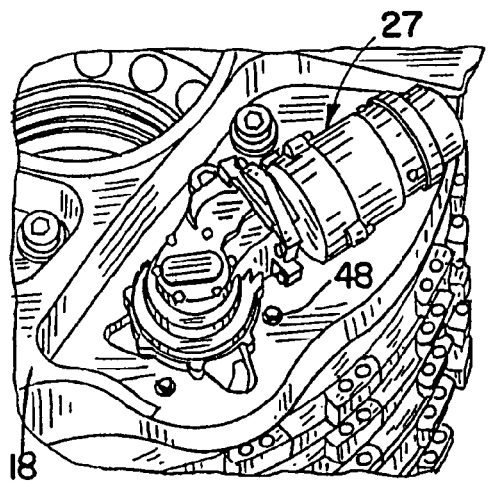
FIGS. 4A-4D are sequence views showing removal of an actuator module from the brake mounting plate.
Figure 4B:
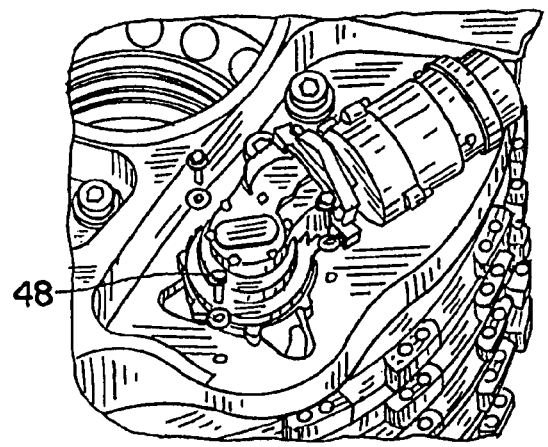
Figure 4C:
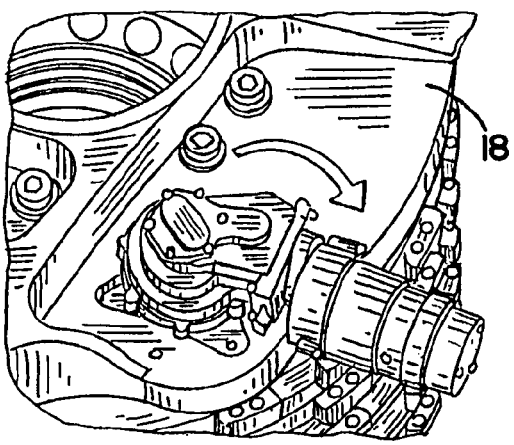
Figure 4D:
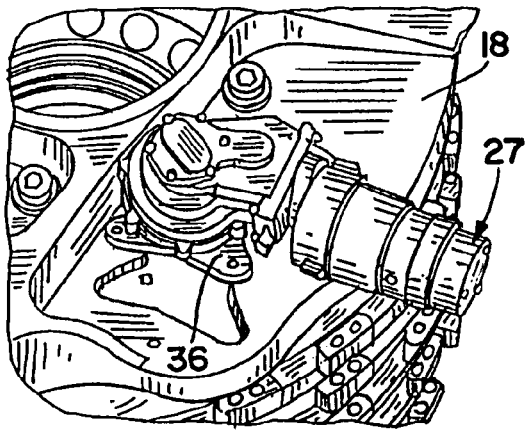

The foregoing arrangement also enables quick and easy swapping in and out of the actuator modules which preferably are line replaceable units while the brake is installed on the landing gear. FIGS. 4A-4D illustrate removal of one of the actuator modules. In FIG. 4A, the actuator module is shown attached to the brake mounting plate in its normal operating position. In such position, the actuator module is generally located with a cylindrical envelope defined by the brake mounting plate. In FIG. 4B, the fasteners 48 have been removed to free the actuator module for rotation. In FIG. 4C, the actuator module is rotated outwardly to align the lobes of the mounting flange with the lobes of the aperture. In the illustrated embodiment, the actuator module is rotated 60 degrees. Once the lobes have been aligned, the actuator module can be moved away from the brake mounting plate as shown in FIG. 4D, with the mounting flange passing freely through the aperture. Installation is facilitated in a similar manner, except with steps in reverse order.

As shown in FIG. 3, the housing 34 of each actuator module 27 can be formed from several parts, and these parts can be associated with respective parts or sections of the actuator module. Generally, the actuator module has a ram drive section 55, a motor section 56 and a transmission section 57 connecting the ram drive section to the motor section. These sections can be removable with respect to one another, as might be desired to facilitate assembly and/or refurbishing the actuator module.

Figure 5:
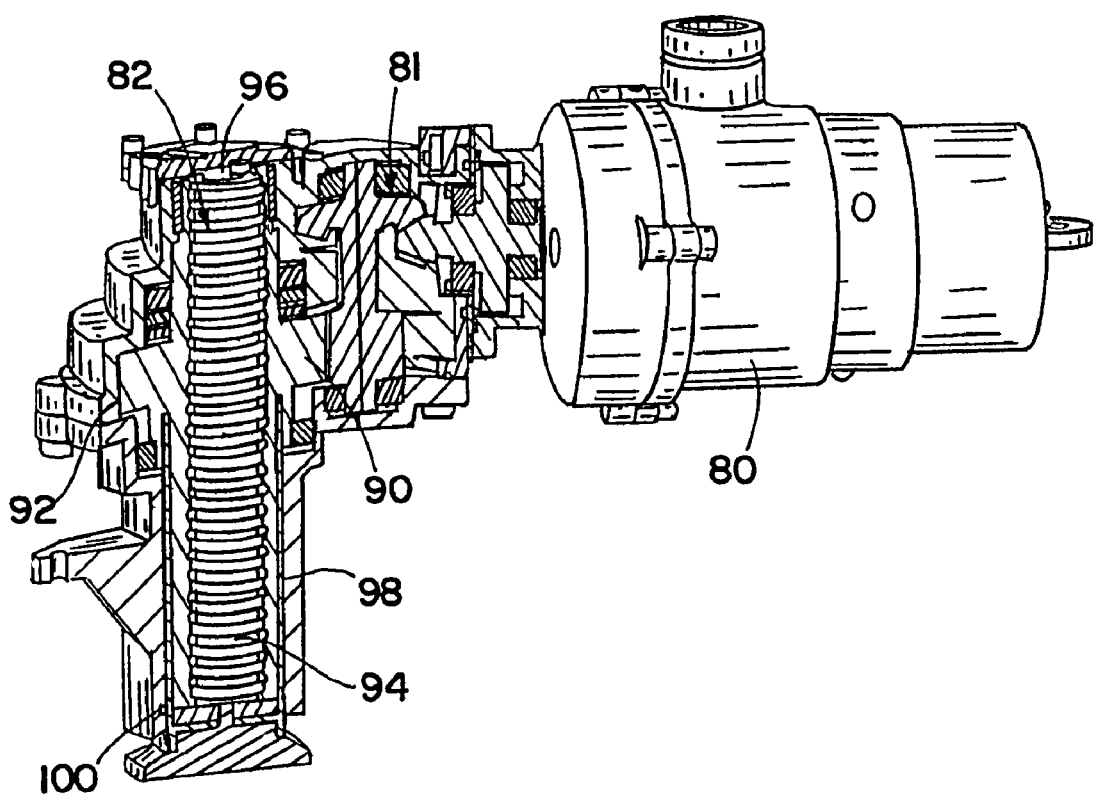
FIG. 5 is a perspective view, partly broken away in section, of the actuator module.
Figure 6:
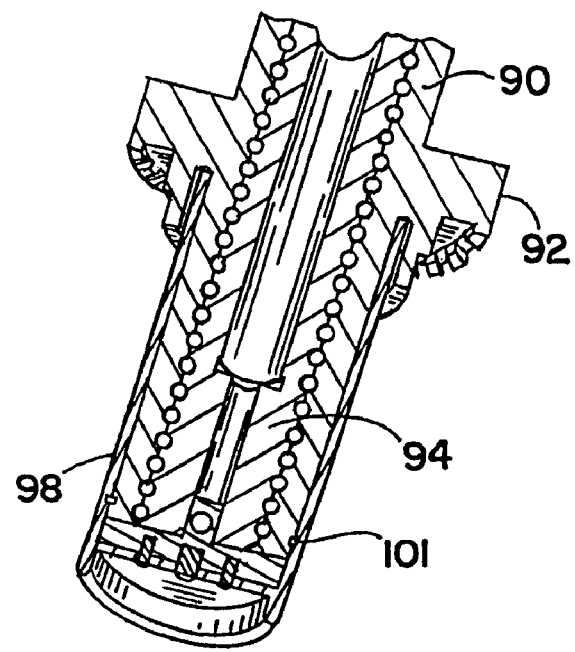
FIG. 6 is a partial cross-sectional view of a ram section of the actuator module.

Referring now to FIGS. 5 and 6, the illustrated representative actuator module 27 preferably includes an electric motor 80, a multi-stage reduction gear train 81, and a ball screw assembly 82. The motor 80, gearing 81 and ball screw assembly 82 are all carried in the module housing 34 and are removable as a single unit. Suitable bearings are provided for the various rotating components. An electrical connector 84 is provided on the housing for interfacing the motor with control circuitry.

The ball screw assembly 82 includes a ball nut 90 having a gear 92 in mesh with the output end of gearing 81. The ball screw assembly further includes a ball screw 94 that moves linearly upon rotation of the ball nut, an anti-rotation guide member 96 extending into the hollow interior of the ball screw, and a ram sleeve 98 that is telescoped over an axially outer portion of the ball nut. The ball screw and ball nut have respective spiral grooves/threads and associated balls for converting rotary motion to linear motion. Also, other rotary to linear motion conversion devices may by employed, if desired, with the linear moving member coinciding with the ball screw and functioning at its outboard end as the actuator ram. In the illustrated ball screw assembly, the interior bore of the screw and the anti-rotation guide have corresponding non-circular, e.g. polygonal, cross-sections which rotationally interfere with one another to restrain rotation of the screw relative to the housing.

The ball screw assembly translates the rotary motion from the gear train to the linear motion at the actuator output. Mechanical stops can be provided to limit the stroke of the translating screw, and a stop can be used as an absolute position indicator for calibrating the actuator stroke position.

The translating ball screw functions as the actuator ram and contacts the carbon brake disc stack through an insulator. The screw can be made of Inconel for thermal considerations. By simply changing the ball screw assembly the stroke length can easily be modified to allow the actuator to operate on many different aircraft brake assemblies with different stroke lengths.

The ram sleeve 98, which can be attached to the end of the ball screw, provides a sealing enclosure and can also function as an insulating interface with the brake disk stack. A dynamic seal/scraper 100 is used to seal the ram sleeve to the housing to prevent fluid from entering the actuator, and an inner seal/scraper 101 can be provided to seal between the screw and the ram nut. The sleeve telescopically slides on a cylindrical end portion of the ram nut with a sliding fit in the housing. The sleeve has a length sufficient to cover the length of the screw that will project from the housing at full extension, while still remaining coextensive with the ran nut.

The outer end of the sleeve is closed and can be configured to provide a convenient means to attach an insulating pad 71 to the end of the ram, which pad provides the interface to the brake disk pressure plate and inhibits heat transfer into the actuator module.

As will be appreciated, rotation of the motor 31 in one direction will effect extension of the screw/ram for engaging and squeezing the brake disk stack, whereas rotation in the opposite direction will effect retraction of the ram, as for releasing braking force. In any given position of the ram, the gear train can be locked by the bi-stable holding brake if the gearing or motor is so-equipped. This is desirable, for example, to retain the ram in an extended position applying braking force to the brake disk stack when the plane is parked, thereby to keep the brake engaged to prevent movement of the aircraft. Although other types of braking devices can be used to maintain the actuators in a brake-engaged condition, preferably the holding brake is a bi-stable device that will latch and hold in either on or off positions, even when no power is being applied to the brake. However, when pulsed the device can be switched between its on and off positions.

As above mentioned, a problem arises if an actuator fails in an extended position applying a high compressive force to the brake disk stack. Under such conditions, a high reactionary load will be applied to the failed actuator, making it awkward and difficult to remove the failed actuator.

In accordance with the present invention, the extended failed actuator can be removed by first causing one or more of the operative actuators to apply to the brake disk stack a compressive force greater than the compressive force exerted by the failed actuator whereby the reactionary force acting on the failed actuator will be reduced. The failed actuator can be easily removed after the reactionary load on the failed actuator has been reduced by demounting from the actuator mount.

Prior to causing the operative actuators to be extended, the mating connector of the failed actuator may be disconnected and then the other actuators may be provided a command signal from the controller to extend.

After removal of the failed actuator, a replacement actuator may be installed in place of the failed actuator.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiment or embodiments of the invention. In addition, while a particular feature of the invention may have been described above with respect to only one of several illustrated embodiments, such feature may be combined with one or more other features of the other embodiments, as may be desired and advantageous for any given or particular application.

What is claimed is:

1. A method of servicing a failed actuator of a brake assembly that includes multiple actuators for compressing a brake disk stack,
wherein the failed actuator has failed in an extended position applying compressive force to the brake disk stack and at least one of the other actuators remains operative, the method comprising the steps of:
causing one or more of the operative actuators to apply to the brake disk stack a compressive force greater than the compressive force exerted by the failed actuator whereby the reactionary force acting on the failed actuator will be reduced and
removing the failed actuator after the reactionary force on the failed actuator has been reduced.

2. A method according to claim 1, wherein the actuators are controlled by a brake controller, and wherein the causing step includes commanding the one or more of the operative actuators to extend and apply compressive force to the brake disk stack.

3. A method according to claim 2, wherein each actuator is connected to the controller by a mating connector, and the method further comprises disconnecting the mating connector of the failed actuator prior the one or more of the operative actuators being commanded to extend.

4. A method according to claim 1, further comprising the step of installing a replacement actuator in place of the failed actuator.

5. A method according to claim 1, wherein the actuators are mounted to an actuator mount at one side of the brake disk stack, and a back stop located on the opposite side of the brake disk stack is fixed against axial movement relative to the actuator mount, and the removing step includes demounting the failed actuator from the actuator mount.

6. A method according to claim 5, wherein the actuators have a flange for engaging a side of the actuator mount facing the brake disk stack, whereby axial reactionary loads are transferred from the actuator flange to the actuator mount, and wherein in the failed condition the failed actuator is jammed between the brake disk stack and the actuator mount.

* * * * *